(12) United States Patent
Hadley et al.

(10) Patent No.: US 8,177,160 B2
(45) Date of Patent: May 15, 2012

(54) CLUTCH ARRANGEMENT

(75) Inventors: Kevin Richard Hadley, Much Wenlock (GB); John Herbert Harvey, Wolverhampton (GB); Andrew Robert Hawksworth, Shifnal (GB); Edward George Hill, Redditch (GB); Mark Whitehouse, Ellesmere (GB)

(73) Assignee: Goodrich Actuation Systems Limited, Solihull (GB)

( * ) Notice: Subject to any disclaimer, the term of this patent is extended or adjusted under 35 U.S.C. 154(b) by 521 days.

(21) Appl. No.: 12/414,872

(22) Filed: Mar. 31, 2009

(65) Prior Publication Data

US 2009/0242692 A1    Oct. 1, 2009

(30) Foreign Application Priority Data

Apr. 1, 2008   (GB) .................................. 0805820.8

(51) Int. Cl.
*B64C 25/00* (2006.01)
(52) U.S. Cl. ........ 244/100 R; 244/50; 475/314; 475/320
(58) Field of Classification Search .................... 244/50, 244/51, 100 R, 99.2, 99.3; 475/314, 315, 475/320, 321
See application file for complete search history.

(56) References Cited

U.S. PATENT DOCUMENTS

| | | | |
|---|---|---|---|
| 3,391,580 A * | 7/1968 | Stadler ......................... | 74/388 R |
| 3,711,043 A * | 1/1973 | Cameron-Johnson .......... | 244/50 |
| 3,921,264 A * | 11/1975 | Madonian et al. ............ | 475/154 |
| 5,086,994 A | 2/1992 | Donnelly et al. | |
| 2003/0199356 A1 | 10/2003 | Biallas | |
| 2006/0166775 A1 * | 7/2006 | Gradu .......................... | 475/101 |
| 2007/0023211 A1 * | 2/2007 | Keller et al. ................. | 180/65.2 |
| 2007/0066432 A1 * | 3/2007 | Schmidt .......................... | 475/5 |

FOREIGN PATENT DOCUMENTS

| | | |
|---|---|---|
| EP | 2020379 | 2/2009 |
| GB | 811767 | 4/1959 |
| WO | 0177520 | 10/2001 |

OTHER PUBLICATIONS

European Search Report dated Jul. 24, 2009.
Abstract of Japanese Application No. JP20030130149, Nov. 25, 2004.

* cited by examiner

*Primary Examiner* — Timothy D Collins
*Assistant Examiner* — Jamie S Stehle
(74) *Attorney, Agent, or Firm* — Andrus, Sceales, Starke & Sawall, LLP

(57) ABSTRACT

A clutch arrangement, especially adapted for use in an aircraft nose wheel landing gear steering arrangement, includes a rotatable drive input, a rotatable output, and an epicyclic gear arrangement, and a carrier upon which the planet gears are mounted, the drive input being connected to the ring gear of the gear arrangement or the carrier, the output being connected to the other of the ring gear or the carrier, and a clutch operable to control relative rotation between the ring gear and the sun gear and to direct the major portion of the torque being transmitted therethrough the first of two transmission paths.

8 Claims, 2 Drawing Sheets

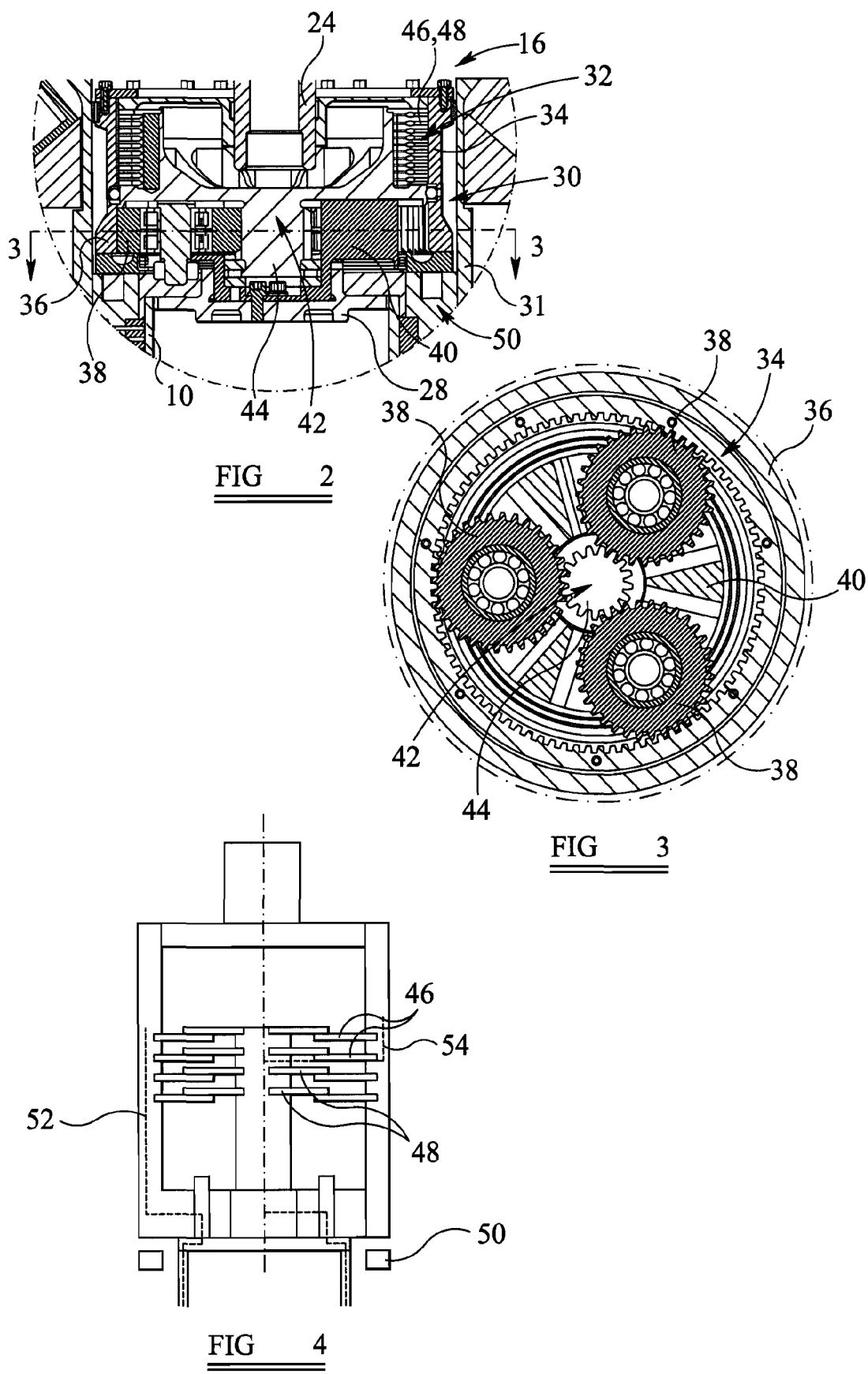

CLUTCH ARRANGEMENT

BACKGROUND

This invention relates to a clutch arrangement, and in particular to a clutch arrangement suitable for use in applications in which large torque loadings are transmitted through the clutch arrangement.

One application in which high torque loadings are experienced is in the steering of the nosewheel landing gear of an aircraft. One form of nosewheel landing gear comprises a drive tube arranged to be rotated, in use, by a motor, for example of electrically powered form. An oleo shock absorber tube is connected to the lower end of the drive tube in a telescopic manner, and an axle support is mounted to the lower end of the oleo tube. A steering linkage transmits steering loads from the drive tube to the axle support. In use the motor is operated to control the angular position of the drive tube and hence to control the orientation of the axle support, thereby achieving steering of the wheels carried by the axle support.

There are some applications in which it is desirable to be able to break the transmission of drive between the motor and the drive tube. For example, during tugging or towing it may be desirable to disconnect the drive between the motor and the drive tube and allow the wheels to operate as a castor, finding their own orientation. Further, in the event of a failure or jam in the motor or associated gearbox it may be desirable to disconnect the drive tube from the motor. In order to permit the disconnection of the drive between the motor and the drive tube it is known to provide a clutch arrangement therebetween.

In use, the torque loading which must be transmitted from the motor and associated gearbox to the drive tube is large, and so where a clutch arrangement is located therebetween, the clutch arrangement must be capable of transmitting large torque loadings. The clutch arrangements used in such applications are thus typically large and require large, heavy actuators to permit release thereof. The size and weight of such arrangements is undesirable.

SUMMARY OF THE INVENTION

It is an object of the invention to provide a clutch arrangement suitable for use in such applications which is of relatively small size and low weight. Another object of the invention is to provide a nosewheel landing gear steering arrangement incorporating such a clutch arrangement.

According to one aspect of the invention there is provided a clutch arrangement comprising a rotatable drive input, a rotatable output, and an epicyclic gear arrangement comprising a ring gear, a series of planet gears meshing with the ring gear, a sun gear meshing with the planet gears, and a carrier upon which the planet gears are mounted, the drive input being connected to one of the ring gear and the carrier, the output being connected to the other of the ring gear and the carrier, and a clutch device operable to control relative rotation between the ring gear and the sun gear.

The clutch device preferably comprises a first series of clutch discs mounted to the ring gear, a second series of clutch discs mounted to the sun gear and interposed between the first series of clutch discs, and an actuator operable to control the compression of the first and second series of clutch discs.

In use, when the clutch device is controlled such that the clutch discs are compressed against one another, relative rotation between the sun and ring gears is not permitted, thus the planet gears are unable to rotate about their axes. In such a mode of operation, the carrier and ring gear will rotate together, thus torque is transmitted between the input and output. Release of the clutch device permits the sun gear to rotate relative to the ring gear, reducing or avoiding the transmission of torque between the input and output.

In such an arrangement, when torque is being transmitted through the clutch arrangement, the torque is transmitted along first and second transmission paths. The first transmission path includes the ring gear, planet gears and carrier. The second transmission path includes the ring gear, clutch device, sun gear, planet gears and carrier. The nature of the epicyclic gear arrangement is such that the majority of the torque is transmitted through the first transmission path, thus only a relatively small proportion of the applied torque is transmitted through the clutch device. The clutch device can therefore be of reduced size and weight.

According to another aspect of the invention there is provided a nosewheel landing gear steering arrangement comprising a motor, a drive tube connected to an axle support, and a clutch arrangement as defined hereinbefore located between the motor and the drive tube to control the transmission of torque therebetween.

BRIEF DESCRIPTION OF THE DRAWINGS

The invention will further be described, by way of example, with reference to the accompanying drawings, in which:

FIG. 2 is a sectional view illustrating part of the arrangement of FIG. 1 to an enlarged scale;

FIG. 3 is a sectional view along the line 3-3 in FIG. 2; and

FIG. 4 is a simple diagrammatic view illustrating the clutch arrangement of the embodiment of FIG. 1.

Figure 1:
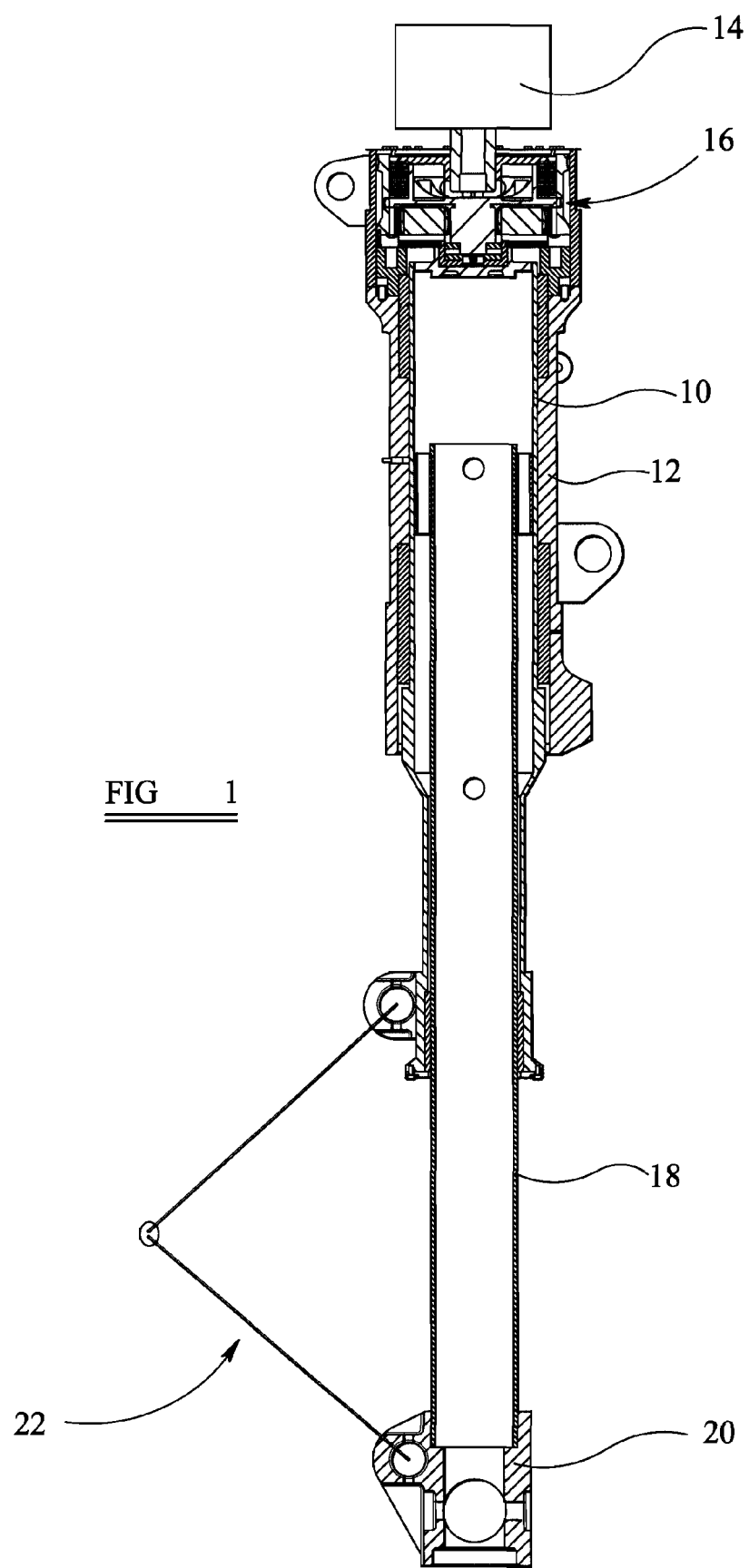
FIG. 1 is a sectional view illustrating a nosewheel landing gear steering arrangement in accordance with one embodiment of the invention.

Referring firstly to FIG. 1 there is illustrated an aircraft nosewheel landing gear steering arrangement comprising a cylindrical drive tube 10 of hollow form rotatably mounted within a cylindrical bore of a housing 12. An electrically powered motor and gearbox 14 is arranged to apply a torque, through a clutch arrangement 16, to the drive tube 10, to control the angular position of the drive tube 10 relative to the housing 12.

DETAILED DESCRIPTION

An oleo shock absorber tube 18 is mounted to the drive tube 10 in a telescopic fashion, and an axle support 20 is mounted to the lower end of the oleo tube 18. A steering linkage 22 is connected between the drive tube 10 and the axle support 20 to transmit torque therebetween, thereby ensuring that angular movement of the drive tube 10 under the control of the motor is transmitted to the axle support. An axle and associated wheels are supported by the axle support 20.

In use, when the clutch arrangement 16 is operated so as to transmit torque between the motor and gearbox 14 and the drive tube 10, it will be appreciated that control over the operation of the motor can be used to control the orientation of the drive tube 10, and hence the orientation of the axle support 20, thereby controlling steering. When the aircraft is being driven externally, for example by being tugged or towed, or in the event of a failure or jam in the motor or gearbox, the clutch arrangement 16 is released to disconnect the drive tube 10 from the motor and thereby allow free movement of the axle support 20 about the axis of the drive tube 10.

The clutch arrangement 16, as illustrated in greater detail in FIGS. 2 to 4, comprises a drive input 24 connected to an output shaft from the motor and gearbox 14, a rotatable output 28 connected to the drive tube 10, an epicyclic gear arrangement 30 and a clutch device 32.

The epicyclic gear arrangement 30 comprises a ring gear 34, supported by bearings for rotation relative to a housing 31, the ring gear 34 including a toothed region 36, the teeth of which mesh with the teeth of a series of planet gears 38. As shown in FIG. 3, in the illustrated embodiment, three planet gears 38 are provided, but it will be understood that more planet gears could be provided if desired. Each planet gear 38 is supported for rotation about its axis by a carrier 40. The epicyclic gear arrangement 30 further comprises a sun gear 42 including a toothed region 44, the teeth of which mesh with the planet gears 38.

The clutch device 32 includes a first series of clutch plates 46 keyed to a part of the ring gear 34 spaced from the toothed region 36, and a second series of clutch plates 48 keyed to an opposing part of the sun gear 42 spaced from the toothed region 44. The clutch plates of the first series 46 alternate with those of the second series 48. The clutch device 32 further comprises an electromagnetic actuator 50 of which the ring gear 34 forms the armature. The actuator 50 is mounted on the housing 31 and is operable such that energisation of the actuator 50 moves the ring gear 34 axially relative to the sun gear 42, compressing the clutch plates 46, 48 so as to resist relative angular movement between the ring gear 34 and the sun gear 42. Deenergisation of the actuator 50 reduces the compression between the clutch plates 46, 48, allowing slipping of the clutch device 32 to occur, thus permitting relative angular movement between the ring gear 34 and the sun gear 42.

The ring gear 34 is splined to the drive input 24, the splined connection permitting limited axial movement of the ring gear 34 to occur upon switching of the actuator 50. The carrier 40 is connected to the output 28.

In use, when the actuator 50 is energised, the clutch device 32 operates to resist relative angular movement between the ring gear 34 and the sun gear 42. As the ring gear 34 and sun gear 42 are unable to rotate relative to one another, it will be appreciated that the planet gears 38 are unable to rotate about their axes and are thus fixed relative to the ring gear 34 and sun gear 42. The carrier 40 is thus fixed against angular movement relative to the ring gear 34.

It will be appreciated that in this mode of operation, torque is transmitted through the clutch arrangement 16 between the drive input 24 and output 28, and thus that torque applied by the motor and gearbox 14 is transmitted to the drive tube 10.

The clutch arrangement 16 includes two separate torque transmission paths. A first path 52 includes the ring gear 34, planet gears 38 and carrier 40. A second path 54 includes the ring gear 34, the clutch plates 46, 48, the sun gear 42, the planet gears 38 and the carrier 40. The nature of the epicyclic gear arrangement 30 is such that the majority of the torque is transmitted through the first transmission path 52, only a relatively small proportion of the applied torque being transmitted along the second torque transmission path 54. Consequently, it will be appreciated that the clutch device 32 needs to be capable of transmitting only a relative small proportion of the applied torque and so can be of relatively small, lightweight form.

When it is desired to disconnect the drive tube 10 from the motor and gearbox 14, for example to allow the wheel to act as a castor during tugging or towing, or in the event of a failure or jamming in the motor and gearbox 14, the clutch device 32 is released by deenergising the actuator 50. Such deenergisation reduces the compression of the clutch plates 46, 48, allowing slipping therebetween and so allowing relative rotation to occur between the ring gear 34 and sun gear 42. In this mode of operation, an external load causing rotation of the drive tube 10 results in the carrier 40 rotating relative to the ring gear 34. Such relative rotation causes the planet gears 38 to precess about the ring gear 34. During such precessing movement, the rotation of the planet gears 38 causes the sun gear 42 to rotate relative to the ring gear 34. As described above, the release of the clutch device 32 permits such rotation to occur. It will be appreciated that if power to the clutch device 32 is interrupted or lost, then this is the mode of operation to which the clutch arrangement will default.

As outlined hereinbefore, the clutch arrangement of the invention is advantageous in that the clutch arrangement is capable of transmitting large torque loadings whilst being of relatively compact, low weight form and requiring only the use of a relative small, low weight actuator to control the operation thereof.

It will be appreciated that although one embodiment of the invention has been described hereinbefore, a number of modifications and alterations may be made to the clutch arrangement and/or associated nosewheel landing gear without departing from the scope of the invention.

The invention claimed is:

1. A nosewheel landing gear system having a nosewheel and a clutch arrangement comprising a rotatable drive input, a rotatable output, and an epicyclic gear arrangement comprising a ring gear, a series of planet gears meshing with the ring gear, a sun gear meshing with the planet gears, and a carrier upon which the planet gears are mounted, the drive input being connected to one of the ring gear and the carrier, the output being connected to the other of the ring gear and the carrier, and a clutch device operable to control relative rotation between the ring gear and the sun gear, wherein when torque is being transmitted through the clutch device, the torque is transmitted along first and second transmission paths, the first transmission path including the ring gear, planet gears and carrier and the second transmission path including the ring gear, clutch device, sun gear, planet gears and carrier, the majority of the torque being transmitted through the first transmission path.

2. A nosewheel landing gear system according to claim 1, wherein the clutch device comprises a first series of clutch discs mounted to the ring gear, a second series of clutch discs mounted to the sun gear and interposed between the first series of clutch discs, and an actuator operable to control the compression of the first and second series of clutch discs.

3. A nosewheel landing gear system according to claim 2, wherein the actuator is an electromagnetic actuator operable to adjust the axial position of one of the ring gear and the sun gear.

4. A nosewheel landing gear system according to claim 3, wherein the ring gear forms or is secured to an armature of the actuator.

5. A nosewheel landing gear system according to claim 1, wherein the clutch device is electrically powered, and wherein the clutch device permits relative movement between the ring gear and the sun gear when unpowered.

6. A nosewheel landing gear system according to claim 1, comprising a motor, a drive tube connected to an axle support, and wherein said clutch arrangement is located between the motor and the drive tube to control the transmission of torque therebetween.

7. A nosewheel landing gear system according to claim 6, wherein the clutch drive input is connected to the motor and the clutch output is connected to the drive tube.

8. A nosewheel landing gear system according to claim 6, wherein the clutch device is electrically powered, and wherein the clutch device permits relative movement between the ring gear and the sun gear when unpowered to permit a wheel supported by the drive tube to move as a castor.

* * * * *